(12) United States Patent
Hanaoka

(10) Patent No.: US 8,434,304 B2
(45) Date of Patent: May 7, 2013

(54) CYLINDER APPARATUS

(75) Inventor: Mitsuhiro Hanaoka, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 902 days.

(21) Appl. No.: 12/561,774

(22) Filed: Sep. 17, 2009

(65) Prior Publication Data

US 2010/0071547 A1    Mar. 25, 2010

(30) Foreign Application Priority Data

Sep. 19, 2008  (JP) .............................. P. 2008-240536

(51) Int. Cl.
*F15B 7/08*    (2006.01)

(52) U.S. Cl.
USPC .......................................................... 60/588

(58) Field of Classification Search ............... 60/588; 277/551–558
See application file for complete search history.

(56) References Cited

U.S. PATENT DOCUMENTS

| 2004/0144248 A1 | 7/2004 | Ishida |
| 2005/0016174 A1 | 1/2005 | Tsubouchi et al. |
| 2009/0071325 A1 | 3/2009 | Hanaoka et al. |

FOREIGN PATENT DOCUMENTS

| EP | 1 889 767 | 2/2008 |
| FR | 2 912 713 | 8/2008 |
| JP | 54-81453 | 6/1979 |
| JP | 62-166370 | 10/1987 |
| JP | 1-157071 | 10/1989 |
| JP | 11-101349 | 4/1999 |
| JP | 2003-166649 | 6/2003 |
| JP | 2004-231093 | 8/2004 |
| JP | 2005-186925 | 7/2005 |
| WO | 2004/094208 | 4/2004 |

OTHER PUBLICATIONS

Office Action dated Jun. 15, 2010 for corresponding Japanese Application No. 2008-240536 (with English translation).
European Search Report for corresponding European Application No. 09170666.3.

*Primary Examiner* — Michael Leslie
(74) *Attorney, Agent, or Firm* — Andrew M. Calderon; Roberts Mlotkowski Safran & Cole, P.C.

(57) ABSTRACT

A cup seal 21 includes a base portion 21*a* disposed on a cylinder bore opening portion side of a seal groove, and an inner lip portion 21*b* extended from an inner circumferential side of the base portion toward a cylinder bore bottom portion and having an inner circumferential surface slidably abutting against an outer circumferential surface of a piston. In a state where the cup seal 21 is fitted into the seal groove and a plunger 19 is inserted into a cylinder bore 12, an abutting force maximum portion 21*m* where an abutting force against the plunger 19 becomes maximum within an inner circumferential surface of the cup seal 21 is provided on an end portion on the cylinder bore opening portion side of an inner circumferential surface part of the base portion 21*a*.

19 Claims, 5 Drawing Sheets

CYLINDER APPARATUS

BACKGROUND OF THE INVENTION

1. Field of the Invention

The present invention relates to a cylinder apparatus and, particularly to a cylinder apparatus in which a piston is movably inserted into a cylinder bore via a cup seal.

2. Description of Related Art

In a cylinder apparatus, it is known that an annular seal groove is formed on an inner circumferential surface of a cylinder bore into which a piston is movably inserted, and a cup seal for slidably sealing the portion between the cylinder bore and the piston is fitted into the seal groove.

In general, as described in Japanese Patent Unexamined Publication JP-A-2004-231093, the seal groove includes: a seal groove bottom surface extending in a circumferential direction; a bottom-side-surface on a cylinder bore bottom portion side; an opening-side-surface on a cylinder bore opening portion side; and a seal groove opening opened to a piston. Further, the cup seal includes: a base portion disposed on the cylinder bore opening portion side of the seal groove, an inner circumferential lip portion extended from an inner circumferential side of the base portion toward the cylinder bore bottom portion and having an inner circumferential surface which slides relative to an outer circumferential surface of the piston; and an outer circumferential lip portion extended from an outer circumferential side of the base portion also toward the cylinder bore bottom portion and having an outer circumferential surface which abuts against the seal groove bottom surface.

As the seal structure in the cup seal having such a shape, there are known a seal structure in which the tip end side of the inner circumferential lip portion is protruded toward the inner circumference to cause the inner circumferential surface of the tip end of the inner circumferential lip portion to abut against the piston (see, e.g., International Patent Unexamined Publication WO 2004/094208). Further, there also known a seal structure in which the inner circumferential surface of the inner circumferential lip portion is formed in parallel with the outer circumferential surface of the piston to cause the entire inner circumferential surface to abut against the piston (see, e.g., Japanese Patent Unexamined Publication JP-A-2005-186925).

As described in the WO 2004/094208, in the cup seal in which sealing is performed by causing the tip end of the inner circumferential lip portion to abut against the piston, a relief port provided in the piston is positioned at a part close to the tip end of the inner circumferential lip portion in order to reduce an ineffective stroke. However, a flow channel for hydraulic fluid needs to be secured by providing a reduced diameter portion for maintaining the communication between a hydraulic pressure chamber and a reservoir during non-operation of the piston on the outer circumference of the piston or the like. Thus, the problem is encountered that the structure of the cylinder apparatus becomes complicated.

In addition, as described in the JP-A-2005-186925, in the cup seal in which the entire inner circumferential surface of the inner circumferential lip portion is caused to abut against the piston, a seal position for determining a point where pressurization starts at the time of start of the operation of the piston becomes unclear so that there are cases where the ineffective stroke is brought into an unstable state. In this case, the seal position can be clarified by increasing an abutting force of the inner circumferential lip portion against the piston. However, a sliding resistance to the piston is increased so that the problem is encountered that operation feeling is deteriorated.

SUMMARY OF THE INVENTION

Consequently, an object of the present invention is to provide a cylinder apparatus capable of reducing the ineffective stroke with a simple structure and providing excellent operation feeling.

For attaining the above object, according to an aspect of the invention, there is provided a cylinder apparatus including:
a cylinder body including:
a bottomed cylinder bore; and
an annular seal groove provided in the cylinder bore;
a cup seal fitted into the seal groove; and
a piston slidably inserted into the cylinder bore via the cup seal,
wherein the seal groove includes:
a seal groove bottom surface extending in a circumferential direction;
a bottom-side-surface on a cylinder bore bottom portion side;
a opening-side-surface on a cylinder bore opening portion side; and
a seal groove opening opened to a piston side, the cup seal includes:
a base portion disposed on the cylinder bore opening portion side of the seal groove and having a base end surface opposing to the opening-side-surface of the seal groove;
an inner circumferential lip portion extended from an inner circumferential side of the base portion toward the cylinder bore bottom portion and having an inner circumferential surface slidably abutting against an outer circumferential surface of the piston; and
an outer circumferential lip portion extended from an outer circumferential side of the base portion toward the cylinder bore bottom portion and having an outer circumferential surface abutting against the seal groove bottom surface, and
an abutting force maximum portion is provided on the base portion side in an inner circumferential surface of the cup seal at a position where abutting force against the piston becomes maximum within the inner circumferential surface of the cup seal in a state where the cup seal is fitted into the seal groove and the piston is inserted into the cylinder bore.

According to another aspect of the invention, it is adaptable that
the abutting force maximum portion is provided on an inner circumferential surface of the base portion.

According to still another aspect of the invention, it is adaptable that
the abutting force maximum portion is provided on a cylindrical surface formed in parallel with at least one of an inner circumferential surface of the cylinder bore and the outer circumferential surface of the piston.

According to still another aspect of the invention, it is adaptable that
the inner circumferential surface of the cup seal at a position closer to the cylinder bore bottom portion than the cylindrical surface is formed of a conical surface of which diameter gradually reduces toward the cylinder bore bottom portion relative to the cylindrical surface provided with the abutting force maximum portion in a state where the inner circumferential surface of the cup seal does not abut against the piston.

According to still another aspect of the invention, it is adaptable that an abutment portion is provided on a base end surface of the base portion of the cup seal, the abutment portion is protruded from the base end surface of the base portion of the cup seal toward the cylinder bore opening portion so that a protruded end thereof abuts with the opening-side-surface of the seal groove, a contact pressure adjustment portion is provided on the base end surface of the base portion of the cup seal at a position closer to an inner circumference than the abutment portion, the contact pressure adjustment portion does not contact with an inner circumferential side of the opening-side-surface in a state where the cylinder apparatus is in a non-operational state, and the contact pressure adjustment portion contacts with the inner circumferential side of the opening-side-surface in a state where the cylinder apparatus is in an operational state.

According to still another aspect of the invention, it is adaptable that the contact pressure adjustment portion is a conical surface in which distance between the base end surface and an opening-side-surface of the seal groove becomes gradually large toward the inner circumference from the abutment surface, and contact pressure adjustment portion intersects with a cylindrical plane of the cylinder bore at an acute angle.

According to still another aspect of the invention, it is adaptable that the cylinder apparatus is a hydraulic pressure master cylinder for a vehicle.

According to the cylinder apparatus of the present invention, by providing the abutting force maximum portion on the base portion side in the inner circumferential surface of the cup seal, it is possible to reliably set the point where the piston is actuated to start the pressurization of the hydraulic fluid. In particular, since, by providing the abutting force maximum portion on the inner circumferential surface of the base portion, the pressurization of the hydraulic fluid is started at the point when the communication port provided in the piston passes the inner circumferential surface of the base portion, it is possible to reduce the ineffective stroke. In addition, it is possible to suppress an increase in the sliding resistance of the entire cup seal to the piston to the minimum and obtain excellent operation feeling when compared with case where the abutting force of the entire inner circumferential surface is increased.

In particular, by providing the abutting force maximum portion within the range of the cylindrical surface in parallel with at least one of the inner circumferential surface of the cylinder bore and the outer circumferential surface of the piston, it is possible to achieve the stabilization of the abutting force by the cooperation with the base portion disposed in a radial direction, and make the shape of the inner circumferential lip portion simple when compared with the case where a large concave and a large convex are provided on the inner circumferential surface.

Further, by forming the inner circumferential surface at a position closer to the cylinder bore bottom portion than the abutting force maximum portion into the conical surface of which diameter gradually reduces toward the cylinder bore bottom portion, it is possible to stably secure a sealing property during the rise in the hydraulic pressure by elasticity of the tip end side of the inner circumferential lip portion.

Furthermore, the contact pressure adjustment portion is preferably the conical surface in which distance between the base end surface and an opening-side-surface of the seal groove becomes gradually large toward the inner circumference from the abutment surface, and contact pressure adjustment portion intersects with a cylindrical plane of the cylinder bore at an acute angle. According to this structure, it is possible to press the abutting force maximum portion against the piston during the rise in the hydraulic pressure with enhanced reliability.

Consequently, since an improvement in the sealing property and stabilization of the ineffective stroke may be achieved, by applying the cylinder apparatus of the present invention to, e.g., a hydraulic pressure master cylinder for a vehicle of a brake system having a brake control mechanism, it is possible to obtain excellent operation feeling and stably obtain reliable brake control.

DETAILED DESCRIPTION OF EXEMPLARY EMBODIMENTS OF THE PRESENT INVENTION

FIGS. 1 to 5C show one embodiment in which the cylinder apparatus of the present invention is applied to a hydraulic pressure master cylinder for a vehicle of a plunger type.

Figure 3:
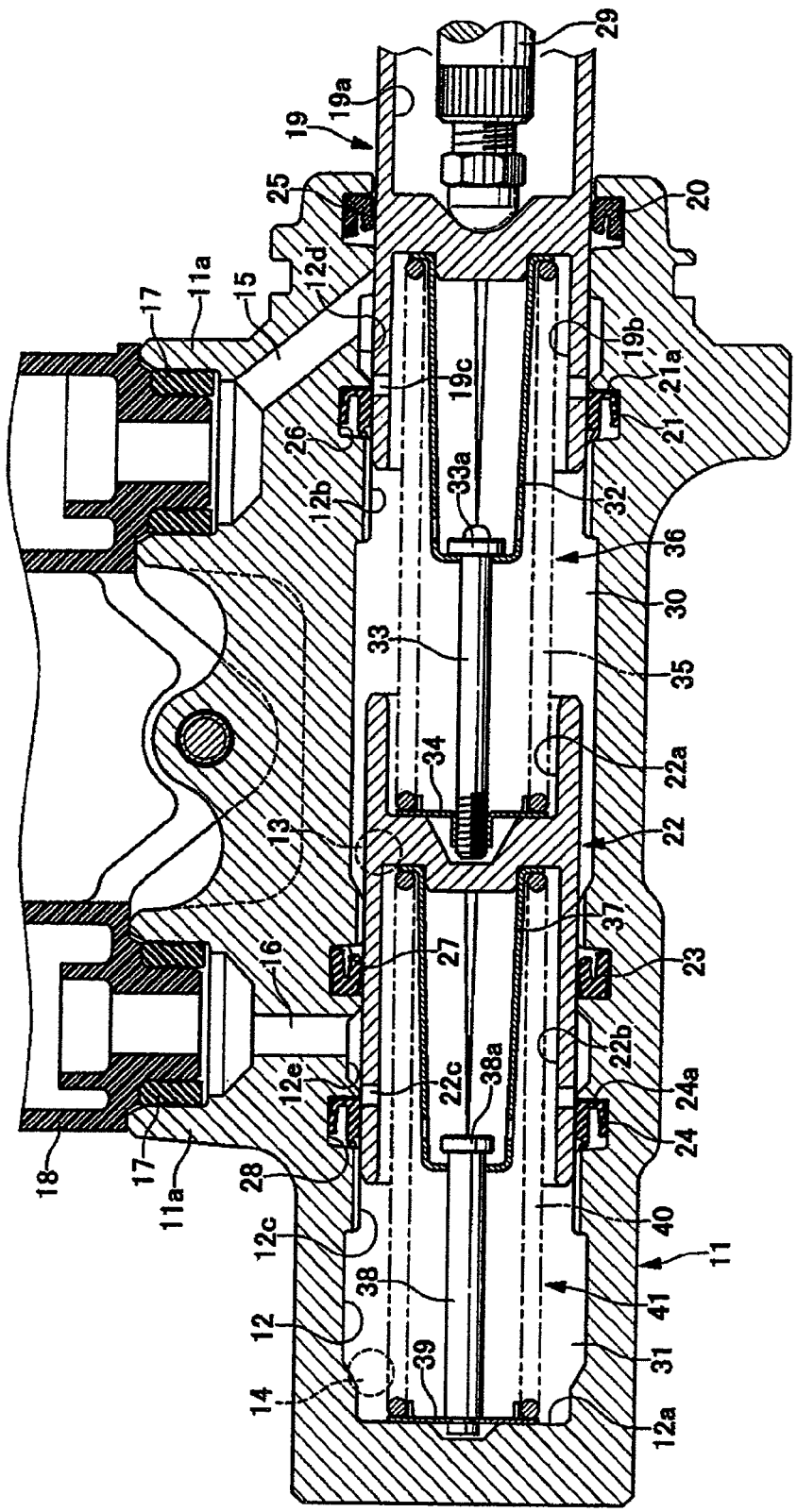
FIG. 3 is a cross-sectional view of a hydraulic pressure master cylinder to which the cylinder apparatus of the present invention is applied.
Figure 4:
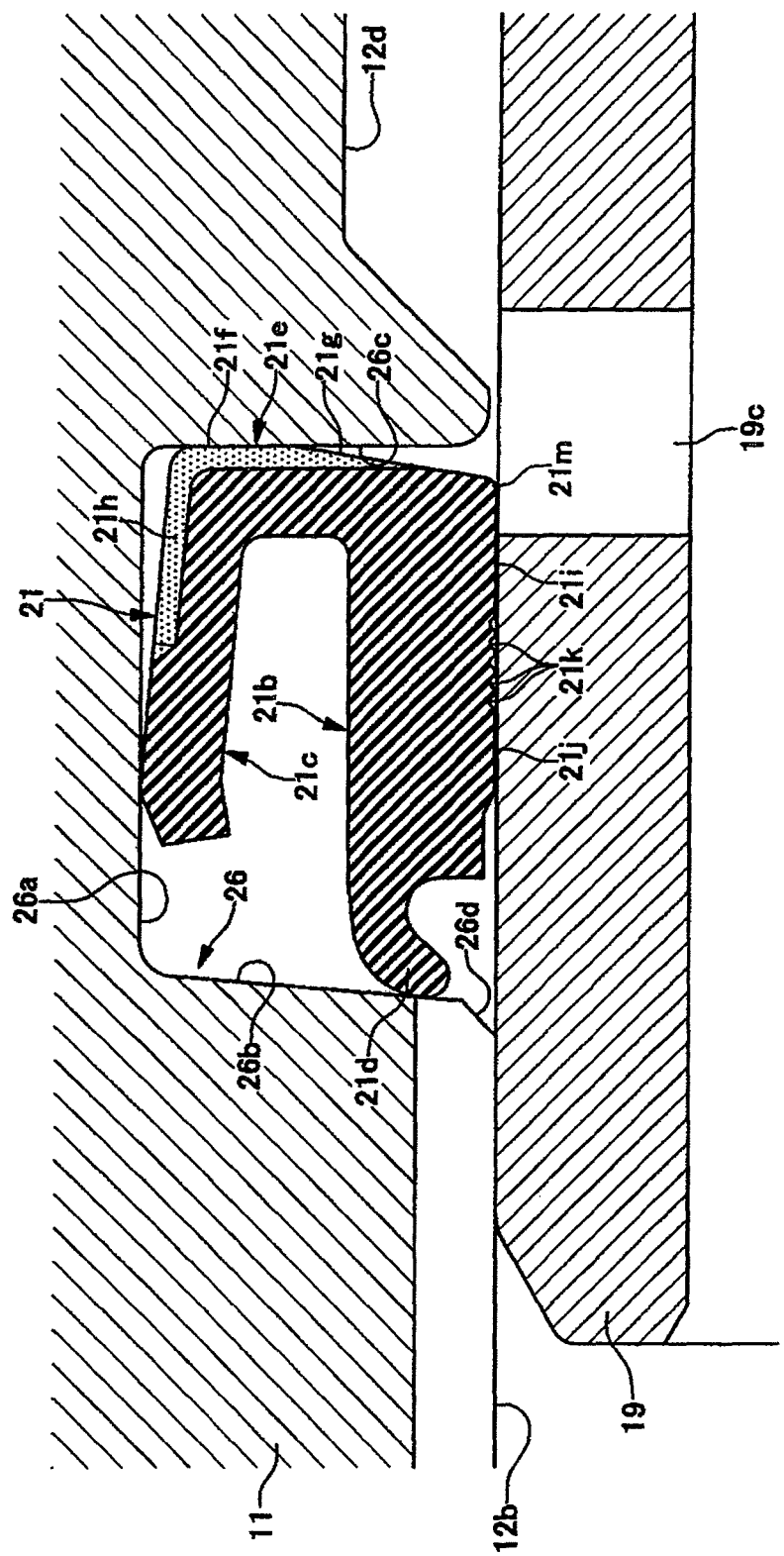
FIG. 4 is an enlarged cross-sectional view of the principal portion of the hydraulic pressure master cylinder.
Figure 5A:
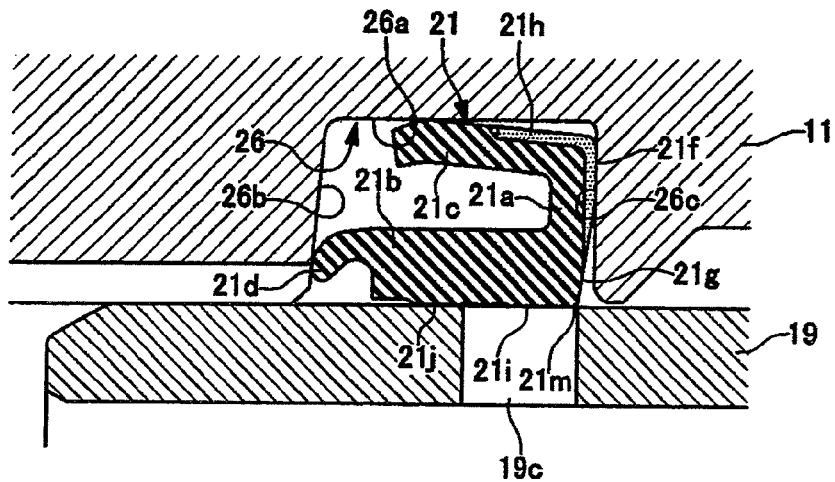
FIGS. 5A to 5C are explanatory views showing states at the time of start of the operation of a piston.
Figure 5B:
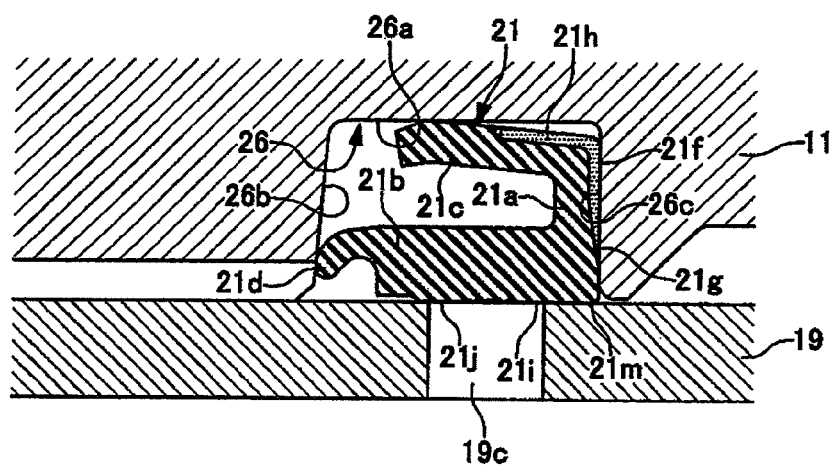
Figure 5C:
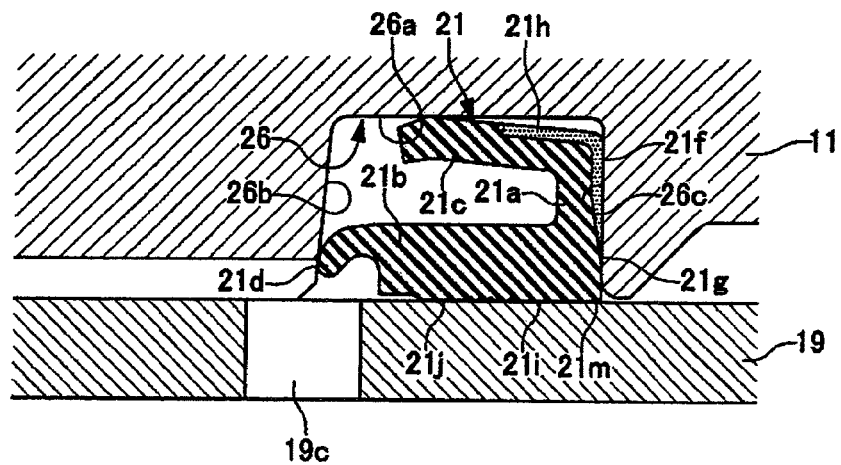

First, as shown in FIG. 3, in a hydraulic pressure master cylinder 10, a bottomed cylinder bore 12 is formed in a cylinder body 11. The cylinder body 11 is formed with a first output port 13 opened in the middle portion in an axial direction of the cylinder of the cylinder bore 12 and a second output port 14 opened on the bottom portion side of the cylinder bore 12. In addition, a pair of boss portions 11a and 11a is provided to be protruded on the upper portion of the cylinder body 11. First and second fluid passage holes 15 and 16 which communicate with the cylinder bore 12 are respectively provided in both of the boss portions 11a and 11a. A reservoir 18 is attached to the boss portions 11a and 11a via grommet seals 17 and 17.

Into the cylinder bore 12, a first plunger 19 (piston) is slidably inserted via first and second cup seals 20 and 21, and a second plunger 22 (piston) is slidably inserted via third and fourth cup seals 23 and 24. The first cup seal 20 is fitted into a first seal groove 25 formed on the cylinder bore opening portion side of the first fluid passage hole 15. The second cup seal 21 is fitted into a second seal groove 26 formed on the cylinder bore bottom portion side of the first fluid passage hole 15. The third cup seal 23 is fitted into a third seal groove 27 formed on the cylinder bore opening portion side of the second fluid passage hole 16. The fourth cup seal 24 is fitted into a fourth seal groove 28 formed on the cylinder bore bottom portion side of the second fluid passage hole 16.

The plungers 19 and 22 are respectively formed with first concave portions 19a and 22a on the cylinder bore opening portion side, and are respectively formed with second concave portions 19b and 22b on the cylinder bore bottom portion side. A push rod 29 is inserted into the first concave portion 19a of the first plunger 19. A first hydraulic pressure chamber 30, which communicates with the first output port 13 provided in the middle portion in the axial direction of the cylinder and the first fluid passage hole 15, is defined between the second concave portion 19b of the first plunger 19 and the first concave portion 22a of the second plunger 22. A second hydraulic pressure chamber 31, which communicates with the second output port 14 provided on the cylinder bore bottom portion side and the second fluid passage hole 16, is defined between the second concave portion 22b of the second plunger 22 and a bottom wall 12a of the cylinder bore 12.

In the first plunger 19, one or more small-diameter communication ports 19c extending through the first plunger 19 are drilled in a circumferential direction at positions closer to the cylinder bore opening portion than the position of the second cup seal 21 in a non-operational state. In the second plunger 22 as well, one or more small-diameter communication ports 22c extending through the second plunger 22 are drilled in the circumferential direction at positions closer to the cylinder bore opening portion than the position of the fourth cup seal 24 in the non-operational state.

In the first hydraulic pressure chamber 30, there is disposed a first spring mechanism 36 including: a first retainer 32 having a substantially cylindrical shape; a first guide pin 33 inserted into the first retainer 32 and having a head portion 33a locked at the tip end portion of the first retainer 32 and a base portion attached to a first attachment plate 34; and a first return spring 35 biasing the first plunger 19 toward the cylinder bore opening portion side.

Further, in the second hydraulic pressure chamber 31, similarly to the first spring mechanism 36, there is disposed a second spring mechanism 41 including: a second retainer 37 having the substantially cylindrical shape; a second guide pin 38 inserted into the second retainer 37 and having a head portion 38a locked at the tip end portion of the second retainer 37 and a base portion attached to a second attachment plate 39; and a second return spring 40 biasing the second plunger 22 toward the cylinder bore opening portion side.

In the cylinder bore 12, small-diameter cylinder portions 12b and 12c are respectively formed on the cylinder bore bottom portion side of each of the second and fourth seal grooves 26 and 28. A large-diameter cylinder portion 12d communicating with the first fluid passage hole 15 and the communication port 19c and a large-diameter cylinder portion 12e communicating with the second fluid passage hole 16 and the communication port 22c are respectively formed on the cylinder bore opening portion side of each of the second and fourth seal grooves 26 and 28. The first and third seal grooves 25 and 27 are well-known annular seal grooves, and the first and third cup seals 20 and 23 are well-known cup seals.

Because the present invention is applied to the second cup seal 21 fitted into the second seal groove 26 and the fourth cup seal 24 fitted into the fourth seal groove 28, and the second and fourth cup seals 21 and 24 have the same structure, a description will be given hereinbelow to the second seal groove 26 and the second cup seal 21 with reference to FIGS. 1, 2, 4, and 5, and a detailed description and depiction of the fourth seal groove 28 and the fourth cup seal 24 will be omitted.

The second seal groove 26 is an annular groove having a seal groove bottom surface 26a extending in a circumferential direction, a bottom-side-surface 26b which is located on a cylinder bore bottom portion side; a opening-side-surface 26c which is located on a cylinder bore opening portion side; and a seal groove opening 26d opened on the first plunger 19 side.

The bottom-side-surface 26b is a conical surface such that an axial length between the bottom-side-surface 26b and the opening-side-surface 26c becomes gradually larger toward the inner circumferential side. Further, an imaginary top of the conical surface of the bottom-side-surface 26b is disposed on the cylinder bore bottom side.

The second cup seal 21 includes: a base portion 21a disposed on the cylinder bore opening portion side of the second seal groove 26; an inner circumferential lip portion 21b; and an outer circumferential lip portion 21c.

The inner circumferential lip portion 21b is extended from the inner circumferential side of the base portion 21a toward the bottom portion of the cylinder bore 12 such that its tip end abuts against the bottom-side-surface 26b to block the seal groove opening 26d. Further, the inner circumferential lip portion 21b has an inner circumferential surface in slidably contact with the outer circumferential surface of the first plunger 19.

The outer circumferential lip portion 21c is extended from the outer circumferential side of the base portion 21a toward the bottom portion of the cylinder bore 12. The outer circumferential lip portion 21c has an outer circumferential surface abutting against the seal groove bottom surface 26a of the second seal groove 26.

The radial dimension of the inner circumferential lip portion 21b is made to be larger than the radial dimension of the outer circumferential lip portion 21c. A plurality of elastic protruding pieces 21d are provided on the inner circumferential lip portion 21b so as to protrude from the tip on the outer circumferential side of the inner circumferential lip portion 21b toward the cylinder bore bottom portion in the radial direction at regular intervals.

Further, in a base end surface 21e of the base portion 21a opposes to the opening-side-surface 26c of the second seal groove 26, about half of the base end surface 21e on the outer circumferential side in the radial direction is protruded toward the cylinder bore opening portion side. When the second cup seal 21 is fitted into the second seal groove 26, the base end surface 21e serves as an abutment surface 21f which is brought into surface contact with the part on the seal groove bottom surface 26a side which is the outer circumferential side of the opening-side-surface 26c.

On the other hand, about half of the base end surface 21e on the seal groove opening 26d side in the radial direction which is the inner circumferential side of the base end surface 21e serves as a contact pressure adjustment portion 21g (contact pressure adjustment surface) formed of a conical surface. The conical surface of the contact pressure adjustment surface 21g is such that distance between the base end surface 21e and the opening-side-surface 26c becomes gradually large toward the inner circumference from the abutment surface 21f. The conical surface of the contact pressure adjustment surface 21g intersects with an imaginary cylindrical plane of the cylinder bore 12 at an acute angle.

As for the contact pressure adjustment surface 21g, when the hydraulic pressure master cylinder 10 is in the non-operational state, a gap is formed between the half of the opening-side-surface 26c on the inner circumferential side and the half of the base end surface 21e on the inner circumferential side (non-contact state).

On the other hand, when the hydraulic pressure master cylinder 10 is in the operational state, the half of the opening-side-surface 26c on the inner circumferential side and the half of the base end surface 21e on the inner circumferential side contact with each other by deformation of the base portion 21a resulting from a rise in the hydraulic pressure of the first hydraulic pressure chamber 30 (pressure-contact state).

A plurality of communication grooves 21h for causing the inner circumferential side and the outer circumferential side of the base portion 21a to communicate with each other are formed from the abutment surface 21f to the outer circumferential surface of the outer circumferential lip portion 21c on the base portion side. In addition, the length from the abutment surface 21f to the tip end portion of each of the elastic protruding pieces 21d is made to be larger than the length in the axial direction of the second seal groove 26. The tip end portion of each of the elastic protruding pieces 21d abuts against the bottom-side-surface 26b of the second seal groove 26 in a state where the tip end portion of each of the elastic protruding pieces 21d is bent toward the plunger side when the second cup seal 21 is fitted into the second seal groove 26.

Figure 1:
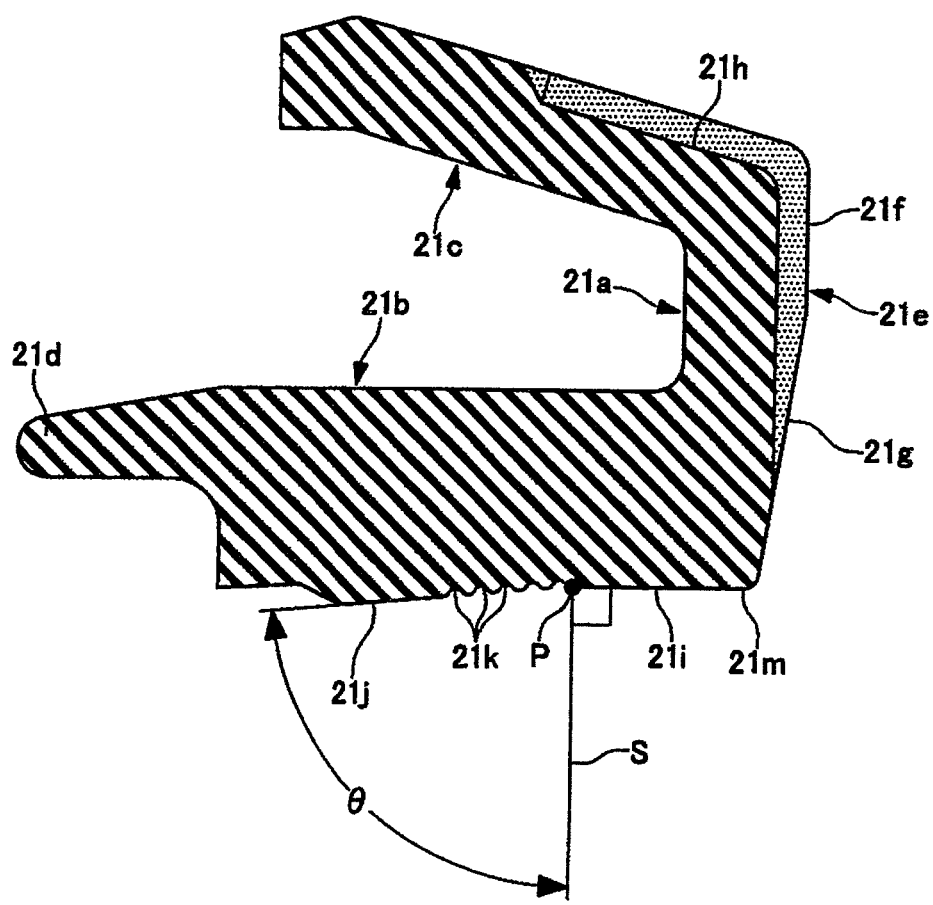
FIG. 1 is a cross-sectional view showing one embodiment of a cup seal used in a cylinder apparatus of the present invention.
Figure 2:
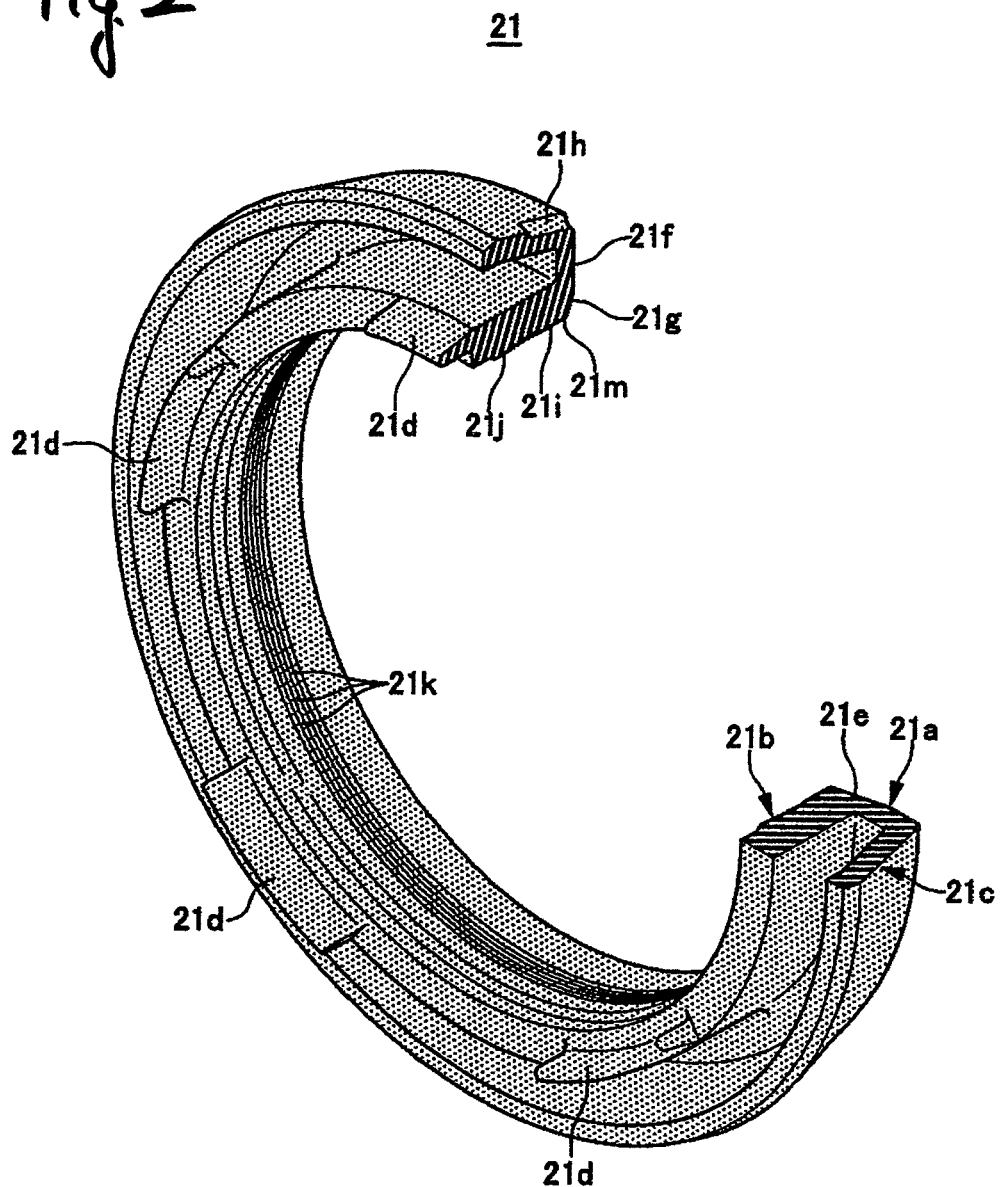
FIG. 2 is a partially cutaway perspective view of the cup seal.

In a state where the second cup seal 21 is not fitted into the second seal groove 26, the base portion 21a side of the inner circumferential surface of the second cup seal 21 serves as a cylindrical surface 21i which is in parallel with the inner circumferential surface of the cylinder bore 12 and the outer circumferential surface of the first plunger 19. The inner circumferential surface at a position closer to the tip end than the cylindrical surface 21i (i.e., as shown in FIG. 1, the inner circumferential surface at a position closer to the cylinder bore bottom portion than a point P in the middle portion in the axial direction of the cylinder bore) serves as a conical surface 21j which gradually reduces its diameter toward the cylinder bore bottom portion at an angle of $\theta$ relative to a plane S orthogonal to the cylindrical surface 21i.

The conical surface 21j is formed such that the tip end portion of the conical surface 21j abuts against the outer circumferential surface of the first plunger 19 to slightly elastically deform the tip end side of the inner circumferential lip portion 21b toward the outer circumferential direction. Thus, the tip end portion of the conical surface 21j reliably abuts against the outer circumferential surface of the first plunger 19 by a restoring force of the inner circumferential lip portion 21b when the second cup seal 21 is fitted into the second seal groove 26 and the first plunger 19 is inserted into the cylinder bore 12. In addition, a plurality of annular grooves 21k for reducing a sliding resistance to the first plunger 19 are provided in parallel with each other in the circumferential direction on the base portion 21a side of the conical surface 21j.

Further, an abutting force maximum portion 21m is provided at an end portion on the cylinder bore opening portion side of the inner circumferential surface part of the base portion 21a and on the base portion side of the cylindrical surface 21i.

At the abutting force maximum portion 21m, the abutting force against the outer circumferential surface of the first plunger 19 becomes maximum within the inner circumferential surface of the second cup seal 21 by suppressing deformation toward the outer circumferential side using the base portion 21a when the second cup seal 21 is fitted into the second seal groove 26 and the first plunger 19 is inserted into the cylinder bore 12.

When the above described hydraulic pressure master cylinder 10 is in non-operation state, the first and second plungers 19 and 22 are arranged at positions shown in FIG. 3 by the elastic forces of the first and second return springs 35 and 40. Thus, a hydraulic fluid is allowed to flow between the reservoir 18 and the first hydraulic pressure chamber 30 via the first fluid passage hole 15, the large-diameter cylinder portion 12d, and the communication port 19c, and the hydraulic fluid is allowed to flow between the reservoir 18 and the second hydraulic pressure chamber 31 via the second fluid passage hole 16, the large-diameter cylinder portion 12e, and the communication port 22c.

In addition, the distance between the second and fourth seal grooves 26 and 28, and the distance between the communication port 19c of the first plunger 19 and the communication port 22c of the second plunger 22 are set to be equal to each other. Further, the contact pressure adjustment surface 21g is apart from the half of the opening-side-surface 26c on the inner circumferential side.

On the other hand, when the hydraulic pressure master cylinder 10 is in operation state, when the push rod 29 pushes the first plunger 19 toward the cylinder bore bottom portion side, the first plunger 19 moves forward in the cylinder bore 12 toward the bottom portion while compressing the first return spring 35 in the first hydraulic pressure chamber 30 and, at the same time, the second plunger 22 starts to move forward toward the cylinder bore bottom portion.

Further, on the first hydraulic pressure chamber 30 side, the first plunger 19 moves forward from the non-operational state, the end portion of the communication port 19c on the cylinder bore opening portion side passes the end portion of the inner circumferential surface of the second cup seal 21 on the cylinder bore opening portion side, and the communication between the first hydraulic pressure chamber 30 and the reservoir 18 is closed. Then, the hydraulic pressure starts to be generated in the first hydraulic pressure chamber 30, and the pressurized hydraulic fluid is supplied to one brake system via the first output port 13 (see FIG. 5 A).

At this time, since the abutting force maximum portion 21m is provided at the end portion of the inner circumferential surface part of the second cup seal 21 on the cylinder bore opening portion side, the abutting force maximum portion 21m reliably abuts against the outer circumferential surface of the first plunger 19 at the point when the end portion of the communication port 19c on the cylinder bore opening portion side passes the abutting force maximum portion 21m so as to reliably block the communication between the first hydraulic pressure chamber 30 and the reservoir 18. As a result, it is possible to reliably generate the hydraulic pressure at this point.

Further, when the hydraulic pressure starts to be generated in the first hydraulic pressure chamber 30, in the second cup seal 21, force is exerted by the generated hydraulic pressure in a direction in which the base portion 21a, the inner circumferential lip portion 21b, and the outer circumferential lip portion 21c of the second cup seal 21 are pushed and opened from the inside. Then, the base portion 21a, the inner circumferential lip portion 21b, and the outer circumferential lip portion 21c are respectively pressed against the opening-side-surface 26c, the outer circumferential surface of the first plunger 19, and the seal groove bottom surface 26a.

Because of this, the abutment surface 21f of the outer circumferential part of the base portion 21a is brought into strong pressure contact with the opening-side-surface 26c, the inner circumferential part of the base portion 21a is deformed so as to fill in the gap between the contact pressure adjustment surface 21g and the opening-side-surface 26c, and the contact pressure adjustment surface 21g is brought into pressure contact with the opening-side-surface 26c. At this time, the inner circumferential part of the base portion 21a is deformed so as to press the inner circumferential surface of the base portion 21a toward the outer circumferential surface of the first plunger 19 (see FIG. 5 B).

At the point when the hydraulic pressure starts to be generated in the first hydraulic pressure chamber 30, the contact pressure adjustment surface 21g is not in contact with the opening-side-surface 26c so that the contact pressure is not generated between the surfaces 21g and 26c. Thereafter, the contact pressure adjustment surface 21g is brought into pressure contact with the opening-side-surface 26c by the elastic deformation of the inner circumferential part of the base portion 21a resulting from the rise in the hydraulic pressure in the first hydraulic pressure chamber 30 so that the contact pressure is generated between the surfaces 21g and 26c.

Because the contact pressure between the surfaces 21g and 26c is smaller than the contact pressure between the abutment surface 21f (which is already in abutment with the opening-side-surface 26c even before the hydraulic pressure is generated) and the opening-side-surface 26c, the sliding resistance between the surfaces 21g and 26c produced by the contact pressure generated between the surfaces 21g and 26c, which are brought into pressure contact with each other by the hydraulic pressure, may be reduced. Thus, the above-described deformation in which the inner circumferential part of the base portion 21a extends in the radial direction is not impaired by the sliding resistance between the surfaces 21g and 26c.

Consequently, from the point when the first plunger 19 moves forward to close the communication port 19c and the hydraulic fluid starts to be pressurized, it is possible to smoothly press the abutting force maximum portion 21m provided on the inner circumferential surface of the base portion 21a against the opposing outer circumferential surface of the first plunger 19, to optimize the contact pressure between the second cup seal 21 and the first plunger 19, and to stably obtain the reliable sealing force. Because of this, it is possible to prevent an increase in the ineffective stroke even when the forward moving speed of the first plunger 19 is slow, and obtain excellent operation feeling. In addition, since the conical surface 21j provided on the tip end side of the inner circumferential lip portion 21b is also pressed against the outer circumferential surface of the first plunger 19 with the rise in the hydraulic pressure in the first hydraulic pressure chamber 30 resulting from the forward movement of the first plunger 19. Thus, it is possible to sufficiently secure the sealing property provided by the second cup seal 21 (see FIG. 5C).

In addition, the tip end portions of the elastic protruding pieces 21d formed in the second cup seal 21 abut against the bottom-side-surface 26b of the second seal groove 26 in the state where the tip end portions of the elastic protruding pieces 21d are bent toward the first plunger 19. Thus, the movement of the second cup seal 21 in the axial direction of the cylinder is regulated so that the increase and variation in the ineffective stroke are prevented.

Further, since the inner circumferential lip portion 21b is fitted into the second seal groove 26 in the state where the elastic protruding pieces 21d are bent toward the first plunger, the inner circumferential lip portion 21b is constantly biased toward the first plunger by the reaction force to the bending so that it is possible to secure the sealing property between the inner circumferential lip portion 21b and the first plunger 19.

Furthermore, since the radial dimension of the inner circumferential lip portion 21b is made to be larger than the radial dimension of the outer circumferential lip portion 21c, and the elastic protruding pieces 21d are protruded from the tip end of the inner circumferential lip portion 21b on the outer circumferential side, it is possible to improve stiffness of the inner circumferential lip portion 21b, secure the stable sealing property, and obtain large space for the elastic protruding pieces 21d to be bent toward the first plunger when compared with the case where the outer circumferential lip portion 21c has the normal thickness substantially equal to that of the inner circumferential lip portion 21b.

Moreover, the bottom-side-surface 26b of the second seal groove 26 is formed into the conical surface shape having the length dimension in the axial direction from the opening-side-surface 26c which becomes gradually larger toward the inner circumferential side. Thus, component force exerted in the inner circumferential direction out of the reaction force to the bending of the elastic protruding pieces 21d is increased. Therefore, it is possible to bias the inner circumferential lip portion 21b toward the first plunger with enhanced reliability. Further, since the second seal groove 26 is formed into a shape in which the seal groove opening 26d side is widened, it is possible to improve a fitting property of the cup seal 21 into the second seal groove 26, and easily bend the tip end portions of the elastic protruding pieces 21d toward the first plunger.

In addition, when the first plunger 19 is retracted to the initial position, since the elastic protruding pieces 21d are provided at regular intervals and a gap is formed between the adjacent elastic protruding pieces 21d, the hydraulic fluid may satisfactorily flow from the reservoir 18 side into the first hydraulic pressure chamber 30 via the gap and the communication grooves 21h so that the second cup seal 21 is not deformed by force.

Further, since the position of the communication port 19c during the non-operation is disposed at a position closer to the cylinder bore opening portion than the base portion 21a of the second cup seal 21, it is possible to make the flow of the hydraulic fluid passing through the communication port 19c smooth. For an example, when the cylinder apparatus of the present invention is applied to a hydraulic pressure master cylinder for a vehicle of a brake system having a brake control mechanism, the flow of the hydraulic fluid caused by the operation of the brake control mechanism is not hampered.

Further, since an increase in the sliding resistance in the entire cup seal can be suppressed to the minimum when compared with the case where the entire inner circumferential surface of the inner circumferential lip portion 21b is strongly pressed against the first-plunger-side part, excellent operation feeling is obtainable.

The abutting force maximum portion 21m may be formed into an arbitrary shape with an arbitrary structure, and the abutting force maximum portion may be obtained by, e.g., forming appropriate convexes and concaves in the circumferential direction of the inner circumferential lip portion 21b. However, in order to achieve a reduction in the ineffective stroke and an improvement in the fluid flow in the communication port during the non-operation, it is preferable to provide convexes and the concaves on the base portion side in the inner circumferential surface of the cup seal.

Further, it is possible to easily form the abutting force maximum portion 21m by providing the convexes and the concaves on the inner circumferential surface part of the base portion 21a having a large radial dimension, and it is possible to simplify the shapes of the cup seals 21 and 24 by adopting the cylindrical surface 21i in substantially parallel with the inner circumferential surface of the cylinder bore 12 and the outer circumferential surface of the piston (the first plunger 19, the second plunger 22) as the portion provided with the abutting force maximum portion 21m.

Furthermore, the inner circumferential surface of the tip end of the inner circumferential lip portion 21b may be formed into the cylindrical surface similar to the abutting force maximum portion. However, by adopting the conical surface 21j as described above, it is possible to enhance the sealing property when the hydraulic pressure in the hydraulic pressure chamber rises.

Furthermore, the position of a boundary between the abutment surface 21f and the contact pressure adjustment surface 21g is set at a position closer to the outer circumference than an extended base end portion of the inner circumferential lip portion 21b in the radial direction (i.e., a position closer to the outer circumference than a position where the surface on the outer circumferential side of the inner circumferential lip portion 21b is extended and intersected by the base end surface 21e). Therefore, it is possible to sufficiently secure a deformation amount of the base portion 21a and pressing force toward the first plunger 19 when compared with the case where the boundary is located at a position close to the inner circumference of the base portion.

In addition, it is preferable to set the position of the boundary at a position closer to the inner circumference than an extended base end portion of the outer circumferential lip portion 21c (i.e., a position closer to the inner circumference than a position where the surface on the inner circumferential side of the outer circumferential lip portion 21c is extended and intersected by the base end surface 21e). When the boundary is located at a position close to the outer circumference of the base portion, there is a possibility that the deformation amount of the base portion 21a becomes excessively large to impair the stability.

Further, the shape of the contact pressure adjustment surface 21g is not limited to the above-described conical surface, and the contact pressure adjustment surface 21g may also be formed into a spherical shape.

Also on the second hydraulic pressure chamber 31 side, similarly to the first hydraulic pressure chamber 30 side, at the point when the second plunger 22 moves forward from the non-operational state, the end portion of the communication port 22c on the cylinder bore opening portion side passes the base portion 24a of the fourth cup seal 24. Thus, the communication between the second hydraulic pressure chamber 31 and the reservoir 18 is closed by the abutting force maximum portion, the hydraulic pressure starts to be generated in the second hydraulic pressure chamber 31, and the pressurized hydraulic fluid is supplied to the other brake system via the second output port 14.

In the present embodiment, the sealing property during the rise in the hydraulic pressure is improved by forming the inner circumferential surface on the cylinder bore bottom portion side into the conical surface. However, the inner circumferential surface on the cylinder bore bottom portion side may also be formed into a cylindrical surface or a concave and convex surface. In addition, although the abutting force maximum portion is pressed against the piston with enhanced reliability by providing the contact pressure adjustment portion, the contact pressure adjustment portion may not be provided.

While the invention has been described in connection with the exemplary embodiments, it will be obvious to those skilled in the art that various changes and modifications may be made therein without departing from the present invention, and it is aimed, therefore, to cover in the appended claim all such changes and modifications as fall within the true spirit and scope of the present invention.

What is claimed is:

1. A cylinder apparatus comprising:
   a cylinder body comprising:
      a bottomed cylinder bore; and
      an annular seal groove provided in the cylinder bore;
   a cup seal fitted into the seal groove; and
   a piston slidably inserted into the cylinder bore via the cup seal, wherein the seal groove comprises:
      a seal groove bottom surface extending in a circumferential direction;
      a bottom-side-surface on a cylinder bore bottom portion side;
      a opening-side-surface on a cylinder bore opening portion side; and
      a seal groove opening opened to a piston side, the cup seal comprises:
      a base portion disposed on the cylinder bore opening portion side of the seal groove and having a base end surface opposing to the opening-side-surface of the seal groove;
      an inner circumferential lip portion extended from an inner circumferential side of the base portion toward the cylinder bore bottom portion and having an inner circumferential surface slidably abutting against an outer circumferential surface of the piston; and
      an outer circumferential lip portion extended from an outer circumferential side of the base portion toward the cylinder bore bottom portion and having an outer circumferential surface abutting against the seal groove bottom surface, and
   an abutting force maximum portion is provided on the base portion side in an inner circumferential surface of the cup seal at a position where abutting force against the piston becomes maximum within the inner circumferential surface of the cup seal in a state where the cup seal is fitted into the seal groove and the piston is inserted into the cylinder bore, wherein the abutting force maximum portion is provided on a cylindrical surface formed in parallel with at least one of an inner circumferential surface of the cylinder bore and the outer circumferential surface of the piston.

2. The cylinder apparatus of claim 1, wherein the abutting force maximum portion is provided on an inner circumferential surface of the base portion.

3. The cylinder apparatus of claim 1, wherein the inner circumferential surface of the cup seal at a position closer to the cylinder bore bottom portion than the cylindrical surface is formed of a conical surface of which diameter gradually reduces toward the cylinder bore bottom portion relative to the cylindrical surface provided with the abutting force maximum portion in a state where the inner circumferential surface of the cup seal does not abut against the piston.

4. The cylinder apparatus of claim 1, wherein the cylinder apparatus is a hydraulic pressure master cylinder for a vehicle.

5. A cylinder apparatus comprising:
   a cylinder body comprising: a bottomed cylinder bore; and an annular seal groove provided in the cylinder bore;
   a cup seal fitted into the seal groove; and
   a piston slidably inserted into the cylinder bore via the cup seal, wherein the seal groove comprises:
      a seal groove bottom surface extending in a circumferential direction;
      a bottom-side-surface on a cylinder bore bottom portion side;
      a opening-side-surface on a cylinder bore opening portion side; and
      a seal groove opening opened to a piston side, the cup seal comprises:
      a base portion disposed on the cylinder bore opening portion side of the seal groove and having a base end surface opposing to the opening-side-surface of the seal groove;

an inner circumferential lip portion extended from an inner circumferential side of the base portion toward the cylinder bore bottom portion and having an inner circumferential surface slidably abutting against an outer circumferential surface of the piston; and an outer circumferential lip portion extended from an outer circumferential side of the base portion toward the cylinder bore bottom portion and having an outer circumferential surface abutting against the seal groove bottom surface, and an abutting force maximum portion is provided on the base portion side in an inner circumferential surface of the cup seal at a position where abutting force against the piston becomes maximum within the inner circumferential surface of the cup seal in a state where the cup seal is fitted into the seal groove and the piston is inserted into the cylinder bore, wherein an abutment portion is provided on a base end surface of the base portion of the cup seal, the abutment portion is protruded from the base end surface of the base portion of the cup seal toward the cylinder bore opening portion so that a protruded end thereof abuts with the opening-side-surface of the seal groove, a contact pressure adjustment portion is provided on the base end surface of the base portion of the cup seal at a position closer to an inner circumference than the abutment portion, the contact pressure adjustment portion does not contact with an inner circumferential side of the opening-side-surface in a state where the cylinder apparatus is in a non-operational state, and the contact pressure adjustment portion contacts with the inner circumferential side of the opening-side-surface in a state where the cylinder apparatus is in an operational state.

6. The cylinder apparatus of claim 5, wherein the contact pressure adjustment portion is a conical surface in which distance between the base end surface and an opening-side-surface of the seal groove becomes gradually large toward the inner circumference from the abutment surface, and contact pressure adjustment portion intersects with a cylindrical plane of the cylinder bore at an acute angle.

7. A cylinder apparatus comprising:

a cylinder body comprising:
   a bottomed cylinder bore; and
   an annular seal groove provided in the cylinder bore;
a cup seal fitted into the seal groove; and
a piston slidably inserted into the cylinder bore via the cup seal, wherein the seal groove comprises:
   a seal groove bottom surface extending in a circumferential direction;
   a bottom-side-surface on a cylinder bore bottom portion side;
   a opening-side-surface on a cylinder bore opening portion side; and
   a seal groove opening opened to a piston side, the cup seal comprises:
   a base portion disposed on the cylinder bore opening portion side of the seal groove and having a base end surface opposing to the opening-side-surface of the seal groove;
   an inner circumferential lip portion extended from an inner circumferential side of the base portion toward the cylinder bore bottom portion and having an inner circumferential surface slidably abutting against an outer circumferential surface of the piston, wherein a tip end of the inner circumferential lip portion abuts against the bottom-side-surface to block the seal groove opening; and an outer circumferential lip portion extended from an outer circumferential side of the base portion toward the cylinder bore bottom portion and having an outer circumferential surface abutting against the seal groove bottom surface, and an abutting force maximum portion is provided on the base portion side in an inner circumferential surface of the cup seal at a position where abutting force against the piston becomes maximum within the inner circumferential surface of the cup seal in a state where the cup seal is fitted into the seal groove and the piston is inserted into the cylinder bore.

8. The cylinder apparatus of claim 7, wherein
a radial dimension of the inner circumferential lip portion is made to be larger than a radial dimension of the outer circumferential lip portion.

9. The cylinder apparatus of claim 8, further comprising
a plurality of elastic protruding pieces provided on the inner circumferential lip portion so as to protrude from the tip end on the outer circumferential side toward the cylinder bore bottom portion in the radial direction at regular intervals.

10. The cylinder apparatus of claim 7, wherein
about half of the base end surface of the base portion on an outer circumferential side in the radial direction is protruded toward a cylinder bore opening portion side,
the base end surface serves as an abutment surface which is brought into surface contact with a part on the bottom surface side of seal groove which is the outer circumferential side of the opening-side-surface,
about half of the base end surface on the seal groove opening side in the radial direction which is the inner circumferential side of the base end surface serves as a contact pressure adjustment portion formed of a conical surface.

11. The cylinder apparatus of claim 10, wherein
the conical surface of a contact pressure adjustment surface is such that a distance between the base end surface and the opening-side-surface becomes gradually large toward the inner circumference from the abutment surface.

12. The cylinder apparatus of claim 11, wherein
when a hydraulic pressure master cylinder is in a non-operational state, a gap is formed between the half of the opening-side-surface on the inner circumferential side and the half of the base end surface on the inner circumferential side, and
when the hydraulic pressure master cylinder is in an operational state, the half of the opening-side-surface on the inner circumferential side and the half of the base end surface on the inner circumferential side contact with each other by deformation of the base portion resulting from a rise in hydraulic pressure of a hydraulic pressure chamber.

13. The cylinder apparatus of claim 7, wherein
the base portion side of the inner circumferential surface of the cup seal serves as a cylindrical surface which is in parallel with an inner circumferential surface of the cylinder bore and the outer circumferential surface of the piston.

14. The cylinder apparatus of claim 13, wherein the inner circumferential surface at a position closer to the tip end than the cylindrical surface serves as a conical surface which gradually reduces its diameter toward the cylinder bore bottom portion.

15. The cylinder apparatus of claim 14, wherein
conical surface gradually reduces its diameter toward the cylinder bore bottom portion at an angle of θ relative to a plane S orthogonal to the cylindrical surface.

16. The cylinder apparatus of claim 15, wherein
the conical surface is formed such that the tip end of the conical surface abuts against the outer circumferential surface of the piston to slightly elastically deform the tip end of the inner circumferential lip portion toward the outer circumferential direction.

17. The cylinder apparatus according to claim 1, wherein
the abutting force maximum portion is provided in an inner circumferential surface of the base portion,
the abutting force of the abutting force maximum portion against the piston becomes maximum within the inner circumferential surface of the cup seal by having the base portion suppress deformation of the abutting force maximum portion toward the outer circumferential side in the state where the cup seal is fitted into the seal groove and the piston is inserted into the cylinder bore,
a contact pressure adjustment portion is provided on the base end surface of the base portion of the cup seal on a seal-groove-opening side which is an inner circumference side of the abutment portion,
the contact pressure adjustment portion does not contact with an inner circumferential side of the opening-side-surface in a state where the cylinder apparatus is in a non-operational state,
the contact pressure adjustment portion contacts with the inner circumferential side of the opening-side-surface in a state where the cylindrical apparatus in an operational state, and
an inner circumferential portion of the base portion where the contact pressure adjustment portion is provided deforms so as to press the inner circumferential surface of the base portion toward the outer circumferential surface of the piston in the state where the cylinder apparatus is in the operational state.

18. The cylinder apparatus according to claim 5, wherein
the abutting force maximum portion is provided in an inner circumferential surface of the base portion,
the abutting force of the abutting force maximum portion against the piston becomes maximum within the inner circumferential surface of the cup seal by having the base portion suppress deformation of the abutting force maximum portion toward the outer circumferential side in the state where the cup seal is fitted into the seal groove and the piston is inserted into the cylinder bore,
the contact pressure adjustment portion is provided on the base end surface of the base portion of the cup seal on a seal-groove-opening side which is an inner circumference side of the abutment portion, and
an inner circumferential portion of the base portion where the contact pressure adjustment portion is provided deforms so as to press the inner circumferential surface of the base portion toward the outer circumferential surface of the piston in the state where the cylinder apparatus is in the operational state.

19. The cylinder apparatus according to claim 7, wherein
the abutting force maximum portion is provided in an inner circumferential surface of the base portion,
the abutting force of the abutting force maximum portion against the piston becomes maximum within the inner circumferential surface of the cup seal by having the base portion suppress deformation of the abutting force maximum portion toward the outer circumferential side in the state where the cup seal is fitted into the seal groove and the piston is inserted into the cylinder bore,
a contact pressure adjustment portion is provided on the base end surface of the base portion of the cup seal on a seal-groove-opening side which is an inner circumference side of the abutment portion,
the contact pressure adjustment portion does not contact with an inner circumferential side of the opening-side-surface in a state where the cylinder apparatus is in a non-operational state,
the contact pressure adjustment portion contacts with the inner circumferential side of the opening-side-surface in a state where the cylindrical apparatus in an operational state, and
an inner circumferential portion of the base portion where the contact pressure adjustment portion is provided deforms so as to press the inner circumferential surface of the base portion toward the outer circumferential surface of the piston in the state where the cylinder apparatus is in the operational state.

* * * * *